US009828109B2

(12) United States Patent
Mitrovic et al.

(10) Patent No.: US 9,828,109 B2
(45) Date of Patent: Nov. 28, 2017

(54) APPARATUS AND METHODS FOR POWERING AN ELECTRICAL DEVICE ASSOCIATED WITH AN AIRCRAFT ROTOR

(71) Applicant: Pratt & Whitney Canada Corp., Longueuil (CA)

(72) Inventors: Lazar Mitrovic, Longueuil (CA); Richard Ullyott, St-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 451 days.

(21) Appl. No.: 14/338,711

(22) Filed: Jul. 23, 2014

(65) Prior Publication Data

US 2016/0229549 A1    Aug. 11, 2016

(51) Int. Cl.
*F02C 7/32*      (2006.01)
*B64D 41/00*     (2006.01)
(Continued)

(52) U.S. Cl.
CPC .............. *B64D 41/00* (2013.01); *B64C 11/02* (2013.01); *B64C 11/44* (2013.01); *B64D 15/12* (2013.01);
(Continued)

(58) Field of Classification Search
CPC . B64C 11/02; B64C 11/44; F02C 7/32; F02C 7/36; F01D 15/10; F16H 3/663; F16H 3/666
See application file for complete search history.

(56) References Cited

U.S. PATENT DOCUMENTS 4,271,940 A  *  6/1981  Collin ................... B63H 23/08
                                                    192/221
5,899,411 A     5/1999  Latos et al.
(Continued)

FOREIGN PATENT DOCUMENTS

CA          1096185 A       2/1981
DE    102010049885 B4  *  6/2015 ............. F01D 15/10
(Continued)

OTHER PUBLICATIONS

Extend European Search Report dated Dec. 10, 2015 re: Application No. 15177857.8-1754.
(Continued)

*Primary Examiner* — Justin Seabe
(74) *Attorney, Agent, or Firm* — Norton Rose Fulbright Canada LLP (57) ABSTRACT

Apparatus and methods for generating electrical power for powering a device associated with a bladed rotor driven by a gas turbine engine of an aircraft are disclosed. The apparatus includes a rotor shaft coupled the bladed rotor of the aircraft and driven by a turbine shaft of the engine via a speed-reducing gear train. A speed-augmenting power transfer device has an input coupled to the rotor shaft and an output for outputting a rotation speed higher than a rotation speed of the rotor shaft received at the input of the speed-augmenting power transfer device. An electric generator disposed in a hub of the bladed rotor is coupled to the output of the speed-augmenting power transfer device and configured to generate electrical power for the device associated with the bladed rotor.

18 Claims, 6 Drawing Sheets

(51) Int. Cl.
*B64C 11/44* (2006.01)
*B64D 15/12* (2006.01)
*B64D 15/14* (2006.01)
*B64C 11/02* (2006.01)
*B64D 27/10* (2006.01)
*F16H 3/66* (2006.01)

(52) U.S. Cl.
CPC ............. *B64D 15/14* (2013.01); *B64D 27/10* (2013.01); *F02C 7/32* (2013.01); *F16H 3/666* (2013.01); *F05D 2260/40311* (2013.01)

(56) References Cited

U.S. PATENT DOCUMENTS

| | | | |
|---|---|---|---|
| 6,467,725 B1 | 10/2002 | Coles et al. | |
| 6,676,379 B2 | 1/2004 | Eccles et al. | |
| 6,769,874 B2 * | 8/2004 | Arel | B64D 15/12 416/60 |
| 6,855,089 B2 * | 2/2005 | Poulin | F02C 7/36 475/331 |
| 6,895,741 B2 * | 5/2005 | Rago | F01D 15/10 60/226.1 |
| 7,077,631 B2 | 7/2006 | Eccles et al. | |
| 7,104,918 B2 * | 9/2006 | Mitrovic | F16H 1/2836 475/331 |
| 7,144,349 B2 * | 12/2006 | Mitrovic | B64D 35/00 475/331 |
| 7,513,119 B2 | 4/2009 | Zielinski et al. | |
| 8,162,611 B2 | 4/2012 | Perkinson et al. | |
| 8,375,695 B2 * | 2/2013 | Schilling | F01D 15/10 310/114 |
| 8,519,555 B2 | 8/2013 | Dooley et al. | |
| 8,573,927 B2 | 11/2013 | Swift et al. | |
| 2012/0156039 A1 | 6/2012 | Bulin et al. | |
| 2013/0071232 A1 | 3/2013 | Taneja et al. | |
| 2013/0327014 A1 | 12/2013 | Moulebhar | |
| 2016/0053690 A1 | 2/2016 | Perkinson et al. | |

FOREIGN PATENT DOCUMENTS

| | | |
|---|---|---|
| EP | 1785614 A2 | 5/2007 |
| EP | 2562085 A2 | 2/2013 |
| GB | 2461786 A | 1/2010 |
| WO | 03078248 A1 | 9/2003 |

OTHER PUBLICATIONS

Extend European Search Report dated Dec. 18, 2015 re: Application No. 15181841.6-1607.

* cited by examiner

APPARATUS AND METHODS FOR POWERING AN ELECTRICAL DEVICE ASSOCIATED WITH AN AIRCRAFT ROTOR

TECHNICAL FIELD

The application relates generally to aircraft engines and, more particularly, to powering electrical devices associated with aircraft rotors driven by such engines.

BACKGROUND OF THE ART

Prime mover rotors such as propellers of fixed-wing aircraft and main rotors of rotary-wing aircraft have associated equipment such as pitch control devices for adjusting the pitch of the blades of the rotors and also de-icing devices. Typically, hydraulic power from the engine oil is used for pitch control and electrical power can be used for de-icing. Hydraulic power can be relatively inefficient to generate since pumps must be sized for maximum demand and then bypassed for much of the flight cycle and hence can represent a parasitic loss. With respect to supplying electrical power to de-icing devices of a rotor, multiple slip rings and brushes can be necessary to transfer the de-icing power. Slip rings and brushes can be prone to wear and require periodic maintenance.

Improvement is therefore desirable.

SUMMARY

In one aspect, the disclosure describes an apparatus for generating electrical power for powering a device associated with a rotor driven by a gas turbine engine of an aircraft. The apparatus comprises: a rotor shaft configured to be coupled to the bladed rotor of the aircraft and to be driven by a turbine shaft of the engine via a speed-reducing power transfer device; a speed-augmenting power transfer device having an input coupled to the rotor shaft and an output for outputting a rotation speed higher than a rotation speed of the rotor shaft received at the input of the speed-augmenting power transfer device; and an electric generator coupled to the output of the speed-augmenting gear train and configured be disposed inside a hub of the bladed rotor and to generate electrical power for the device associated with the bladed rotor.

In another aspect, the disclosure describes an aircraft engine. The engine comprises: a bladed rotor comprising a hub and an electrical device configured to carry out a function associated with the rotor; a rotor shaft coupled to the bladed rotor, the rotor shaft being coupled to a turbine shaft of the engine via a speed-reducing power transfer device; a speed-augmenting power transfer device having an input coupled to the rotor shaft and an output for outputting a rotation speed higher than a rotation speed of the rotor shaft received at the input of the speed-augmenting power transfer device; and an electric generator disposed in the hub of the bladed rotor and coupled to the output of the speed-augmenting power transfer device, the electric generator being electrically coupled to the electrical device of the rotor.

In a further aspect, there is provided a method of generating electrical power for powering an electrical device for carrying out a function associated with a rotor driven by a gas turbine engine. The method comprises: receiving input rotational motion from a rotor shaft driving the bladed rotor; augmenting an input rotation speed of the input rotational motion to produce an output rotational motion having an output rotation speed higher than the input rotation speed; generating, in a hub of the bladed rotor, electrical power from the output rotational motion at the output rotation speed; and delivering the electrical power to the electrical device associated with the bladed rotor.

DESCRIPTION OF THE DRAWINGS

Reference is now made to the accompanying figures in which.

DETAILED DESCRIPTION

Figure 1:
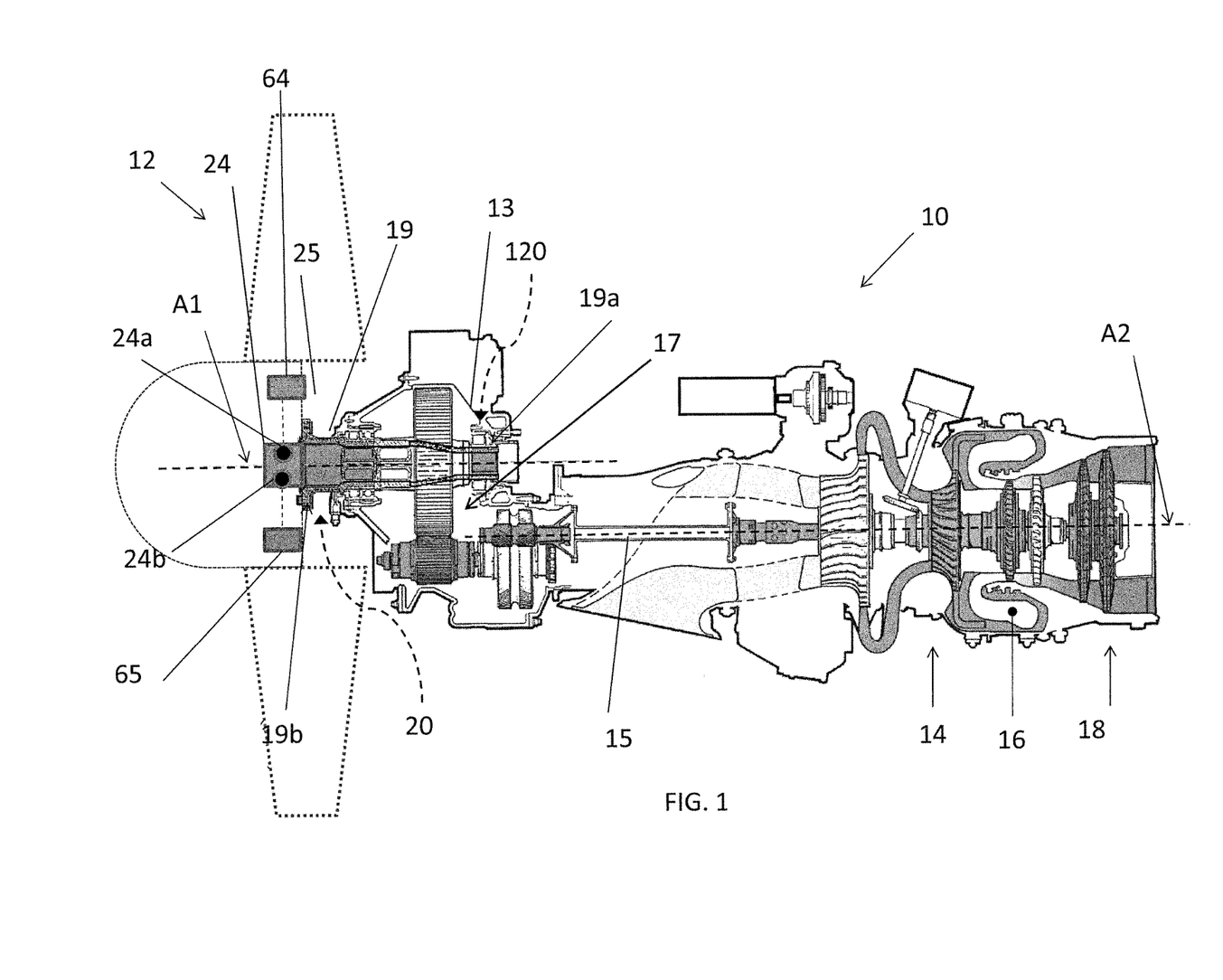
FIG. 1 is a schematic partial cross-sectional view of an exemplary aircraft gas turbine engine for driving a rotor.

FIG. 1 illustrates an aircraft gas turbine engine 10, generally comprising in serial flow communication a bladed rotor 12 providing a prime-mover for the aircraft, in this case in the form of a propeller through which ambient air is propelled, a compressor section 14 for pressurizing ingested air, a combustor 16 in which the compressed air is mixed with fuel and ignited for generating an annular stream of hot combustion gases, and a turbine section 18 for extracting energy from the combustion gases. Bladed rotor 12 may be any suitable prime mover, for example, a propeller of a fixed-wing aircraft, a main (or tail) rotor of a rotary-wing aircraft such as a helicopter (not shown), or a fan of a turbofan engine (not shown).

In the exemplary embodiment shown, a rotor shaft 19 drives the rotor 12. The rotor shaft 19 is entrained by the turbine section 18 via a power turbine shaft 15 and a speed-reducing power transfer device such as, for example, speed-reducing gear train 17 disposed in a housing 13 and between the turbine shaft 15 and the rotor shaft 19. The speed-reducing gear train 17 reduces a rotation speed from the turbine shaft 15 into a rotation speed suitable for the rotor 12. In the embodiment shown in FIG. 1, the rotor shaft 19 is disposed along an axis A1 offset from an axis A2 of the turbine shaft 15. There could be, however, configurations of the engine 10 suitable for application of the present approach, for example where the axes A1 and A2 are substantially coaxial.

In addition to driving the rotor 12, the rotation of the rotor shaft 19 may also be used to generate electrical power for powering one or more electrical devices such as auxiliary systems/devices of engine 10 via a speed-augmenting power transfer device such as, for example, gear train 20 (shown in FIG. 2) coupled to a generator 24. In other embodiments (not depicted), any suitable speed-augmenting power transfer devices (e.g., hydraulic transmission), or combination of devices may be used. In some embodiments, auxiliary devices may be electrically powered and may perform functions associated with the rotor 12. Electrical power may be a more economical alternative to hydraulic power since it may simply be drawn only when required for actuation. Examples of auxiliary devices may include a rotor blade de-icing system 64 and a rotor pitch control system 65. Such devices associated with the rotor 12 may be disposed inside or on rotor 12 and accordingly may be considered part of rotor 12.

Electrically-powered devices that may be disposed within the rotor 12 may include a blade pitch control system 65 and/or a de-icing system 64. During operation, ice may form on propeller blades and alter the aerodynamic characteristics of each blade. Ice formation on the propeller blades may also affect the propulsion characteristics of the engine 10. Commonly, the de-icing system 64 is incorporated into the propeller blades to maintain the aerodynamic characteristics of the propeller blades and such designs are known in the art. Generally, the de-icing systems 64 use electric power to function. Such power can be supplied by the generator 24.

Restarting the engine 10 during flight may require a power source to drive the turbine section 18 to a minimum rotational speed necessary for the compressor section 14 to generate pressure and flow conditions necessary to sustain combustion in the combustor 16. The systems described herein may allow the engine 10 to be self-restarting, thereby eliminating bulking auxiliary systems or reliance on a second engine or an auxiliary power unit. Electric power for restarting the engine 10 may be provided by the generator 24 when the rotor 12 is windmilling. The electric power produced while the rotor 12 is windmilling can be used to drive an electric motor, the electric motor causing the turbine section 18 to accelerate to speeds necessary to sustain combustion within the combustor 16. Once combustion is sustained, the exhaust gases expand through and further accelerate the turbine section 18 to normal operating conditions.

Ram air turbine (RAT) systems may provide emergency power to an aircraft during an engine failure or other electrical failure. RAT systems function by automatically extending a small turbine from the aircraft during an engine failure. The turbine drives a generator that provides electric power to critical aircraft systems. In a manner similar to restarting the engine 10, the present systems can function as a RAT system. During an electrical failure where no power may be available to the airframe, electric power from the generator 24 or from an auxiliary power connection may power an actuation system to position propeller blades for RAT operation. In this configuration, the power generation unit may supply electric power to critical aircraft systems during situations the engine 10 cannot be restarted.

The speed-augmenting gear train 20 is coupled to the rotor shaft 19 at one end (input) and to an output shaft 22 (shown in FIG. 2) at another end (output). The output shaft 22 rotates under the influence of the speed-augmenting gear train 20 at a rotation speed higher than that of the rotor shaft 19. A differential of rotation speed between the rotor shaft 19 and the output shaft 22 is used by the electric generator 24 (shown schematically) to generate power for the one or more of electrical devices 64, 65 described above. The electrical generator 24 may comprise a first rotatable member 24a coupled for rotation with the output (e.g., output shaft 22) of the speed-augmenting gear train 20 and a cooperating second rotatable member 24b coupled for rotation with the rotor shaft 19. In a non-limiting embodiment, the generator 24 may comprise a permanent magnet generator where the first rotatable member 24a comprises one or more magnets and the cooperating second rotatable member 24b comprises one or more windings. In various embodiments, generator 24 may be disposed inside hub 25 of bladed rotor 12.

The electrical generator 24 may be part of a power generation unit (not shown) including an inductive coupling (not shown) and an auxiliary power connection (not shown). The inductive coupling may include windings, each attached to the rotor shaft 19 and the output shaft 22. The inductive coupling communicates signals between the rotor shaft 19 and the output shaft 22. For example, to transmit a signal from the rotor shaft 19 to the output shaft 22, an electric current or signal current is supplied to one of the windings through cables (not shown) which may run through the associated the rotor shaft 19/output shaft 22. The signal current within the winding generates a magnetic field that interacts with the other winding to create a signal voltage therebetween. The inductive coupling may be electrically connected to a controller programmed to perform a function that corresponds to the signal voltage from the winding. The signal current can be varied in several ways for the purpose of transmitting commands to the controller. For example, the signal current can have a variable frequency or voltage, the changes in frequency or voltage causing corresponding changes in the signal voltage in the winding. The controller may be programmed to perform a command corresponding to frequency or voltage changes from the signal current.

The auxiliary power connection may include at least one slip ring and two or more electrical brushes connected to the rotor shaft 19 and the output shaft 22. The auxiliary power connection receives or transits electrical power through cabling that is routed through the output shaft 22 (e.g. passages 60, 61 described below). If multiple electrical circuits are required, additional slip-ring and brushes combinations can be added to auxiliary power connection. The auxiliary power connection can function as a backup system in the event of a failure of power unit by supplying electric power into the rotor 12. In this instance, electric power can be supplied through cabling routed through the output shaft 22 to the brushes. At least one slip-ring can receive the electric power from brushes and transmit the power to an actuation system where it can be used to change the pitch of rotor 12.

The speed-augmenting gear train 20 may be designed to be disposed at or adjacent either end 19a, 19b of the rotor shaft 19. In a first embodiment, the speed-augmenting gear train 20 is disposed at the end 19a of the rotor shaft 19 (see FIGS. 2 to 4), and in a second embodiment, the speed-augmenting gear train 120 (see FIG. 5) is disposed at the end 19b of the rotor shaft 19 inside the hub 25 of the rotor 12. The respective positions of the speed-augmenting gear trains 20, 120 are indicated by stippled lines in FIG. 1. End 19a of the rotor shaft 19 may be relatively distal from rotor 12 and end 19b of the rotor shaft 19 may be relatively proximal to rotor 12. The first or second embodiment of the speed-augmenting gear train 20, 120 may be chosen depending on a type and/or configuration of the engine 10. Some engines may even accommodate the two embodiments of the speed-augmenting gear train 20, 120.

The speed-augmenting gear train 20, 120 or part of it may be designed to fit within the rotor shaft 19, so that the output shaft 22 may be disposed inside the rotor shaft 19, and the electric generator 24 may be disposed between the rotor shaft 19 and the output shaft 22. Other designs of the speed-augmenting gear train 20, 120 may include the speed-augmenting gear train 20, 120 disposed outside of the rotor shaft 19, yet having the output shaft 22 substantially coaxial with the rotor shaft 19. Although a particular engine is shown in FIG. 1 in association with the speed-augmenting gear trains 20, 120, it is contemplated that the assembly of the speed-augmenting gear train 20, 120 and electric generator 24 for providing power to the auxiliary systems may be adapted to any suitable engine configuration.

Figure 2:
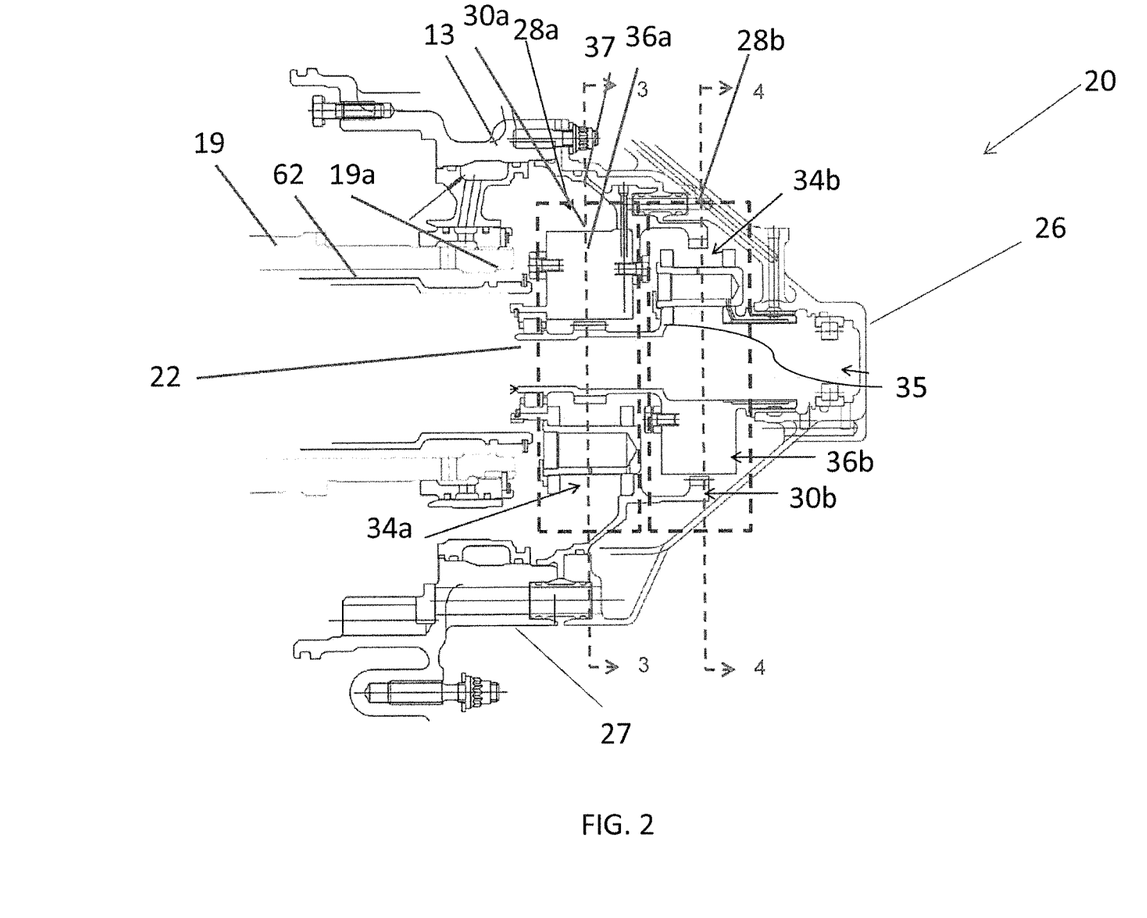
FIG. 2 is an axial cross-sectional view of an exemplary speed-augmenting power transfer device according to a first embodiment for driving a generator for powering an electrical device associated with the rotor of FIG. 1.
Figure 3:
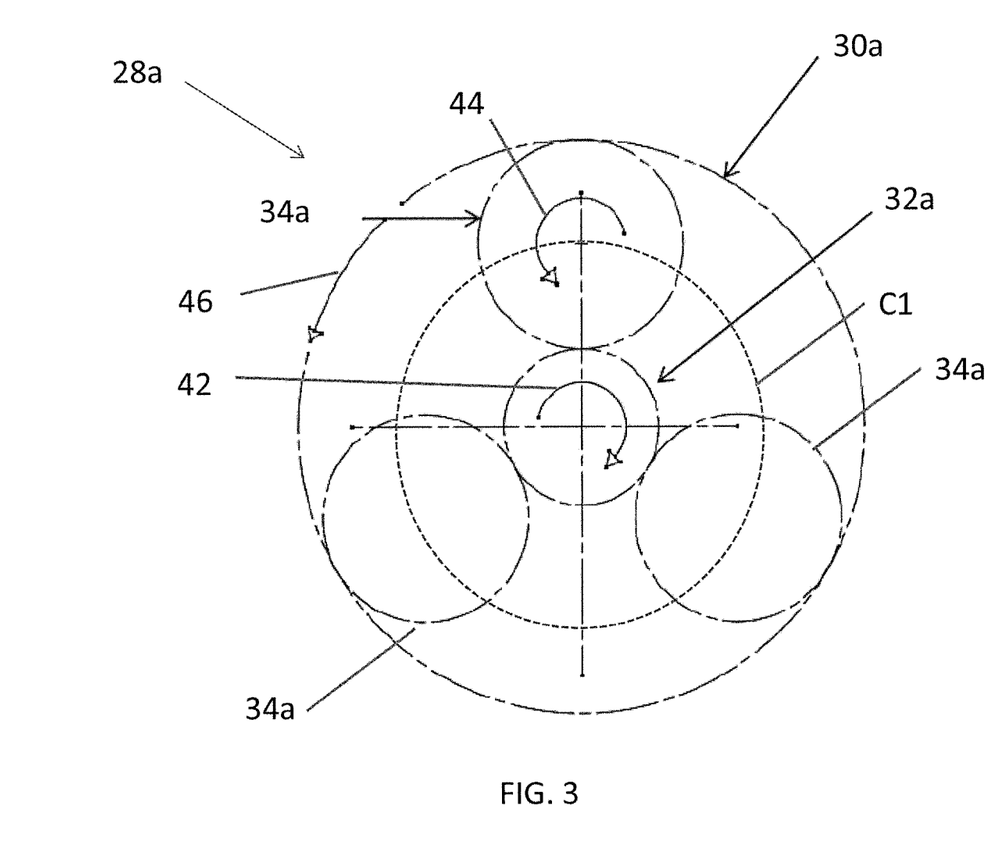
FIG. 3 is a schematic transverse cross-sectional view of a first stage of the speed-augmenting power transfer device of FIG. 2 taken along line 3-3 of FIG. 2.
Figure 4:
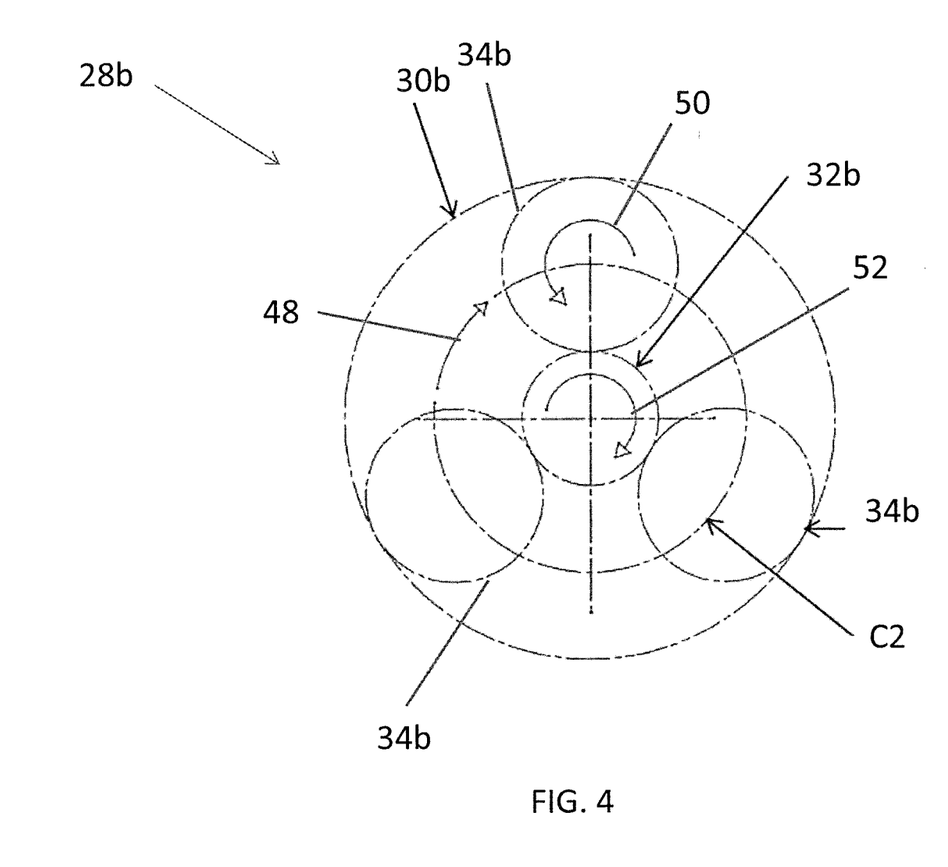
FIG. 4 is a schematic transverse cross-sectional view of a second stage of the speed-augmenting power transfer device of FIG. 2 taken along line 4-4 of FIG. 2.

Turning now to FIGS. 2 to 4, the speed-augmenting gear train 20 is shown in the first embodiment disposed at the end 19a of the rotor shaft 19.

The speed-augmenting gear train 20 is contained in a gearbox housing 26 bolted to a flange 27 of the housing 13 of the speed-reducing gear train 17 at the end 19a of the rotor shaft 19. The speed-augmenting gear train 20 is, in a non-limiting embodiment, a epicyclic two-stage gear train. The speed-augmenting gear train 20 has a first stage 28a augmenting the rotation speed of the output shaft 22 relative to the rotor shaft 19, as well as changing a direction of rotation of the output shaft 22 relative to the rotor shaft 19. By changing the direction of rotation of the output shaft 22 relative to the rotor shaft 19, the output shaft 22 is counter-rotating shaft, which increases relative rotation speed between the rotor shaft 19 and the output shaft 22. The speed-augmenting gear train 20 includes a second stage 28b adding further to the rotation speed of the output shaft 22 relative to that of the rotor shaft 19.

Referring more specifically to FIG. 3, in this example the first stage 28a is an epicyclic gear set comprising a ring gear 30a, a sun gear 32a disposed concentrically to the ring gear 30a and three planet gears 34a disposed between the ring gear 30a and the sun gear 32a. The first stage 28a could have one, two or more than three planet gears 34a. The first stage 28a gear set has a star arrangement where a carrier 36a is fixed (i.e., grounded) to the stationary structure of engine 10 and accordingly the planet gears 34a behave as stars and do not revolve around the sun gear 32a.

The ring gear 30a is fixedly connected to the rotor shaft 19, such that the rotor shaft 19 entrains the ring gear 30a in rotation. The planet gears 34a are disposed on the fixed carrier 36a (shown in FIG. 2) between the ring gear 30a and the sun gear 32a. The carrier 36a is attached to the housing 13 of the speed-reducing gear train 17 via connector 37 (shown in FIG. 2). The carrier 36a provides a structural frame to position the planet gears 34a circumferentially spaced apart relative to each other on a circle C1 which is concentric relative to the sun gear 32a. The planet gears 34a are meshed with the ring gear 30a and with the sun gear 32a such that rotation of the ring gear 30a entrains rotation of the planet gears 34a, which in turn entrains rotation of the sun gear 32a. Arrow 42 represents rotation of the sun gear 32a, arrow 44 represents rotation of the planet gears 34a, and arrow 46 represents rotation of the ring gear 30a. The arrow 46 is in a direction opposite to the arrow 42.

Referring to FIG. 4, in this example the second stage 28b is another epicyclic get set including a ring gear 30b, a sun gear 32b disposed concentrically to the ring gear 30b and three movable planet gears 34b disposed between the ring gear 30b and the sun gear 32b. The second stage 28b has a planetary arrangement where the ring gear 30b is fixed (i.e., grounded) to stationary structure of engine 10. The second stage 28b has a similar ring gear 30b, sun gear 32b and planet gears 34b to the first stage 28a, but rotation of the gears relative to each other is different than in the first stage 28a. In the second stage 28b, the ring gear 30a is fixedly connected to the housing 13 of the speed-reducing gear train 17, while the sun gear 32b is fixedly connected to output shaft 22, such that the sun gear 32b entrains the output shaft 22 in rotation. The second stage 28b could have one or more planet gears 34b. The second stage 28b could also have a different number of planet gears 34b relative to the first stage 28a.

The planet gears 34b are disposed on a movable carrier 36b (shown in FIG. 2) disposed between the ring gear 30b and the sun gear 32b. The planet gears 34b move along a circle C2 in a direction (arrow 48) opposite to that of the sun gear 32a of the first stage 28a, so that the planet gears 34b revolve around the sun gear 32b. The carrier 36b of the second stage 28b is engaged with the sun gear 32a of the first stage 28a, so that the carrier 36b is entrained in rotation by the sun gear 32a via link 35. Similarly to the carrier 36a, the carrier 36b keeps the planet gears 34b circumferentially spaced relative to each other around the sun gear 32b. The planet gears 34b are meshed with the sun gear 32b such that rotation of the planet gears 34b (arrow 50) entrains a rotation of the sun gear 32b (arrow 52). The rotation of the sun gear 32b induced by the planet gears 34b is in a direction opposite to that of the planet gears 34b. The rotation of the sun gear 32b is thus in a direction opposite that the ring gear 30a of the first stage 28a thereby providing the counter-rotation of the output shaft 22 relative to the rotor shaft 19.

in use, when the engine 10 is running, the rotor shaft 19 drives the ring gear 30a in rotation, and the speed-augmenting gear train 20 rotates the output shaft 22 fixed to the sun gear 32b in a direction opposite to that of the rotor shaft 19 and with a higher number of revolutions per minutes. Any suitable speed-augmentation ratio may be provided. in this example, a ratio of between about 12:1 and about 17:1 may be achieved using the above speed-augmenting gear train 20. In one embodiment, a speed-augmentation ratio of about 16:1 may be achieved. In various embodiments, the first stage 28a and the second stage 28b may provide substantially the same or different speed-augmentation ratios. The output shaft 22 extends within the hub 25 to reach the electric generator 24 which exploits the difference in rotation between the output shaft 22 and the rotor shaft 19.

Although the first stage 28a is shown herein to have the fixed carrier 36a and the second stage 28b to have the movable carrier 36b, it is contemplated that the first stage 28a could have the movable carrier 36b and the second stage 28b could have the fixed carrier 36a.

Figure 5:
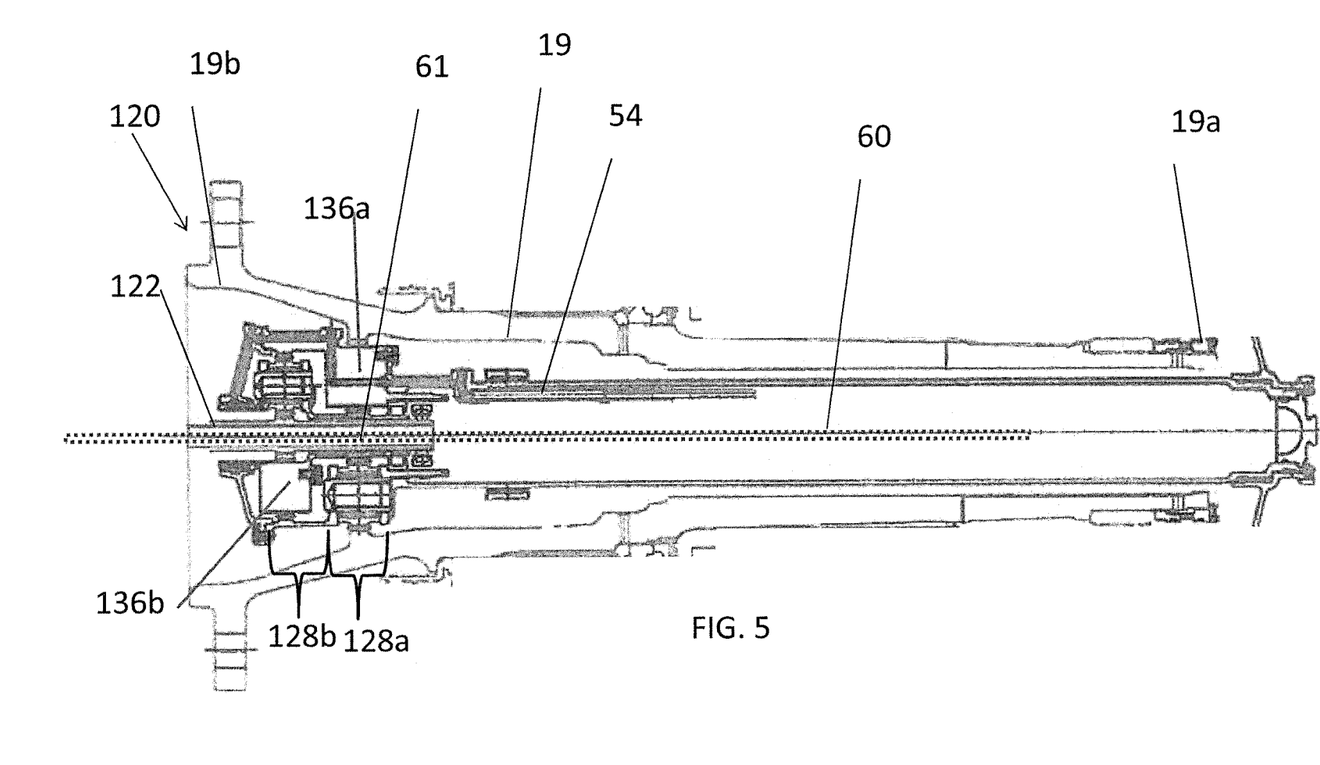
FIG. 5 is an axial cross-sectional view of another exemplary speed-augmenting power transfer device according to a second embodiment for driving the generator for powering the electrical device associated with the rotor of FIG. 1.

Turning now to FIG. 5, the speed-augmenting gear train 120 is shown in the second embodiment disposed at or adjacent to the end 19b of the rotor shaft 19 inside the hub 25 of the rotor 12.

The speed-augmenting gear train 120 has elements common to the speed-augmenting gear train 20. These elements will not be described in details herein again.

The speed-augmenting gear train 120 includes first and second stages 128a, 128b similar to the first and second stages 28a, 28b. The first stage 128a is an epicyclic gear set having a star arrangement with a carrier 136a fixed to the housing 13 of the speed-reducing gear train 17 via shaft 54 running through the rotor shaft 19. The second stage 128b is an epicyclic gear set having a planetary arrangement with a movable carrier 136b. The carrier 136b is moved by its connection to a sun gear 132a of the first stage 128a similarly to the speed-augmenting gear train 20. An output shaft 122 is fixedly connected to a sun gear 132b of the second stage 128b and rotates with it. The output shaft 122 extends within the hub 25 to reach the electric generator 24.

The output shaft 22 and the speed-augmenting gear train 20, 120 may include stationary (non-rotating) through passages 60, 61 respectively. The passages 60, 61 may permit routing of one or more electrical wires between electrical components that may be disposed within the rotor 12 and electrical components disposed away from the rotor 12. These passages 60, 61 may be disposed within the rotor shaft 19 which may also comprise a hollow geometry providing a through passage in communication with through passages 60, 61.

Secondary/emergency power for such electrically-powered and rotor-mounted devices may be provided via conductors routed through passages 60, 61 and suitable slip rings. The through passages 60, 61 may also provide an independent route for hydraulic power to an actuator or a mechanical linkage in addition to or independently from the electric wires described above. The electrical path may also be used for communication with inductive coupling (rotating transformer) instead of slip rings and brushes, as described above. As best shown in FIG. 2, an oil-retaining shaft 62 may be provided between the rotor shaft 19 and the output shaft 22 to restrain oil within the rotor shaft 19.

In various embodiments, the above described power generating apparatus may provide a compact generator 24 coaxial with the rotor shaft 19 and disposed inside hub 25 meeting the power demands of the auxiliary systems (e.g., blade pitch control system 65 and/or a de-icing system 64).

The amount of power extracted from a rotating shaft (e.g. output shaft 22) via generator 24 can depend on a tangential velocity of this shaft relative to the tangential velocity of a reference structure (e.g. rotor shaft 19). To achieve the tangential velocity needed to produce the power required by the auxiliary systems, one needs to have either a large diameter when the shaft rotates at a low rpm, or a small diameter when the shaft rotates at a high rpm. Since the engine shaft 19 rotates at a relatively low rpm (relative to the required power for the auxiliary systems), the speed-augmenting gear trains 20, 120 can be used to produce a high rpm and thereby permit adequate power generation within a relatively small space.

The speed-augmenting gear train 20, 120 may allow to generate the required power to the auxiliary systems while having a compact design which may be fitted within the rotor shaft 19 and/or hub 25. The speed-augmenting gear train 20, 120 may provide a lighter alternative to redesigning the speed-reducing gear train 17 for obtaining same electrical output. The above described power generating apparatus may be adapted to engines having coaxial engine shafts 19 and turbines shafts 15, as well as engines having offset engine shafts 19 and turbines shafts 15.

The substantial concentricity and coaxiality of the rotor shaft 19 and the speed augmenting gear train 20, 120 may optionally provide a through path which may be used for communication, emergency power, and the like. Power and data transmission requirements across the speed-augmenting gear train 20, 120 may be minimised. The apparatus may be applied to other suitable types of aircraft and in other suitable applications such as pitch control systems for wind turbines.

Figure 6:
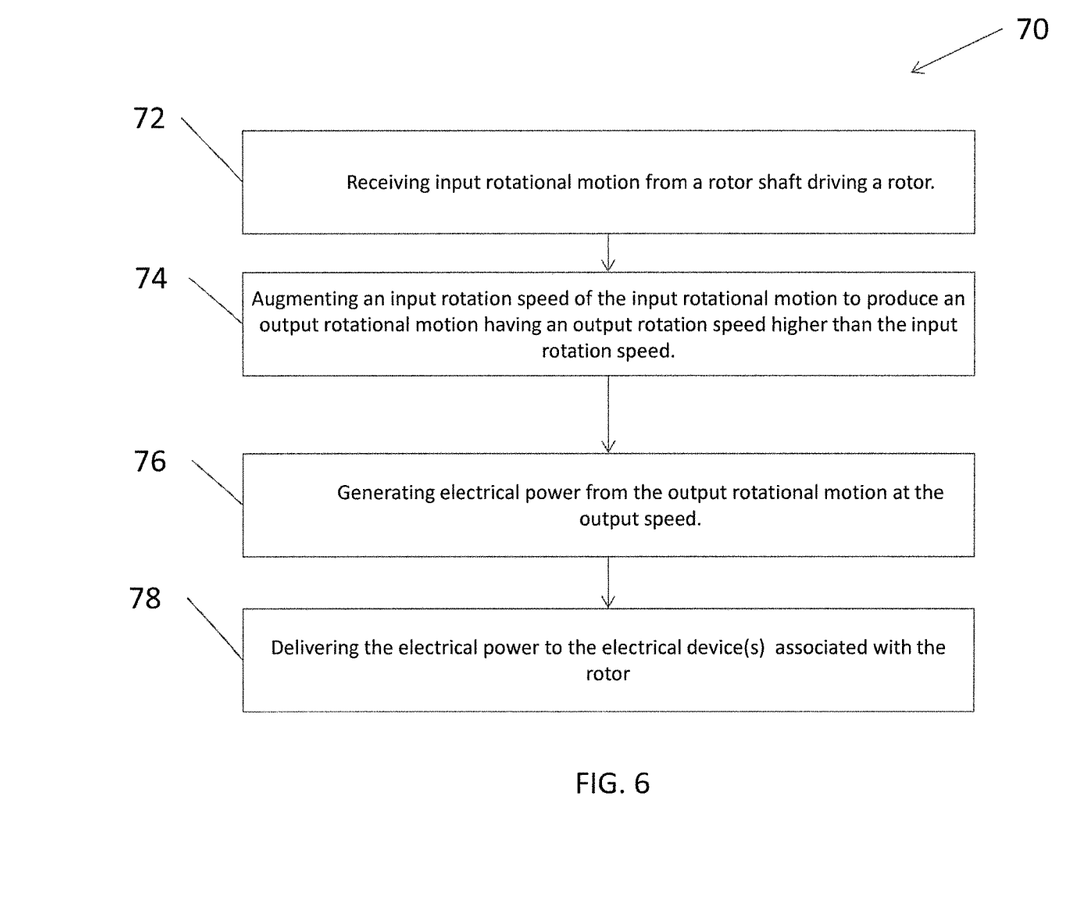
FIG. 6 is a flow chart of an exemplary method of generating electrical power for powering the electrical device using the speed-augmenting power transfer device of either FIG. 2 or FIG. 5.

Turning now to FIG. 6, a method 70 of generating electrical power for powering an electrical device (e.g., de-icing system 64 and the pitch control system 65) for carrying out a function associated with the rotor 12 driven by the gas turbine engine 10 will be described. Method 70 may be performed using the apparatus and devices disclosed herein. Method 70 may comprise: receiving input rotational motion from the rotor shaft 19 driving the rotor 12 (see block 72); augmenting an input rotation speed of the input rotational motion to produce an output rotational motion having an output rotation speed higher than the input rotation speed (see block 74); generating electrical power from the output rotational motion at the output speed (see block 76); and delivering the electrical power to the electrical device 64, 65 associated with the rotor 12.

In various embodiments, the output rotational motion is in a direction opposite that of the input rotational motion.

The above description is meant to be exemplary only, and one skilled in the art will recognize that changes may be made to the embodiments described without departing from the scope of the invention disclosed. For example, the apparatus, devices and methods described herein could be used in helicopters. Still other modifications which fall within the scope of the present invention will be apparent to those skilled in the art, in light of a review of this disclosure, and such modifications are intended to fall within the appended claims.

The invention claimed is:

1. An apparatus for generating electrical power for powering a device associated with a bladed rotor driven by a gas turbine engine of an aircraft, the apparatus comprising:
   a rotor shaft configured to be coupled to the bladed rotor of the aircraft and to be driven by a turbine shaft of the engine via a speed-reducing power transfer device;
   a speed-augmenting power transfer device having an input coupled to the rotor shaft and an output for outputting a rotation speed higher than a rotation speed of the rotor shaft received at the input of the speed-augmenting power transfer device; and
   an electric generator coupled to the output of the speed-augmenting power transfer device and configured to be disposed inside a hub of the bladed rotor and axially coincide with the bladed rotor to generate electrical power for the device associated with the bladed rotor.

2. The apparatus of claim 1, wherein the output of the speed-augmenting power transfer device outputs rotational motion in a direction opposite that of the rotor shaft.

3. The apparatus of claim 1, wherein the electrical generator includes a member coupled for rotation with the rotor shaft.

4. The apparatus of claim 1, wherein the speed-augmenting power transfer device comprises a two-stage epicyclic gear train.

5. The apparatus of claim 4, wherein a first stage of the epicyclic gear train has a star arrangement having a fixed carrier and a second stage of the epicyclic gear train has a planetary arrangement having a fixed ring.

6. The apparatus of claim 1, wherein at least part of the speed-augmenting power transfer device is disposed inside the rotor shaft.

7. The apparatus of claim 1, wherein the speed-augmenting power transfer device is disposed adjacent an end of the rotor shaft and inside the hub of the bladed rotor.

8. The apparatus of claim 1, wherein the speed-augmenting power transfer device is disposed adjacent an end of the rotor shaft distal to the rotor.

9. The apparatus of claim 1, wherein the rotor shaft comprises a first passage therethrough and the speed-augmenting power transfer device comprises a second passage therethrough, the first and second passages being in communication with each other.

10. The apparatus of claim 9, wherein the output of the speed-augmenting power transfer device and the rotor shaft are substantially coaxial.

11. The apparatus of claim 1, wherein the speed-augmenting power transfer device provides a speed ratio of about 16:1.

12. An aircraft engine comprising:
a bladed rotor comprising a hub and an electrical device configured to carry out a function associated with the rotor;
a rotor shaft coupled to the bladed rotor, the rotor shaft being coupled to a turbine shaft of the engine via a speed-reducing power transfer device;
a speed-augmenting power transfer device having an input coupled to the rotor shaft and an output for outputting a rotation speed higher than a rotation speed of the rotor shaft received at the input of the speed-augmenting power transfer device; and
an electric generator disposed in the hub of the bladed rotor and axially coinciding with the bladed rotor, the electric generator being coupled to the output of the speed-augmenting power transfer device, the electric generator being electrically coupled to the electrical device of the rotor.

13. The engine of claim 12, wherein the output of the speed-augmenting power transfer device outputs rotational motion in a direction opposite that of the rotor shaft.

14. The engine of claim 12, wherein the speed-augmenting power transfer device comprises a two-stage epicyclic gear train wherein a first stage of the epicyclic gear train has a star arrangement having a fixed carrier and a second stage of the epicyclic gear train has a planetary arrangement having a fixed ring.

15. The engine of claim 12, wherein the electrical device associated with the rotor comprises one or more of a rotor de-icing system and a pitch control system.

16. The engine of claim 12, wherein the bladed rotor comprises a propeller.

17. A method of generating electrical power for powering an electrical device for carrying out a function associated with a bladed rotor driven by a gas turbine engine, the method comprising:
driving a rotor shaft coupled to the bladed rotor via a speed-reducing power transfer device using a turbine shaft of the gas turbine engine;
receiving input rotational motion from the rotor shaft coupled to the bladed rotor;
augmenting an input rotation speed of the input rotational motion to produce an output rotational motion having an output rotation speed higher than the input rotation speed;
generating, using an electric generator disposed in a hub of the bladed rotor and axially coincident with the bladed rotor, electrical power from the output rotational motion at the output rotation speed and
delivering the electrical power to the electrical device associated with the bladed rotor.

18. The method of claim 17, wherein the output rotational motion is in a direction opposite that of the input rotational motion.

\* \* \* \* \*